United States Patent Office 3,514,386
Patented May 26, 1970

3,514,386
STEREOSELECTIVE ADDITION OF THIOLS TO ACETYLENIC COMPOUNDS
Alexis A. Oswald, Westfield, and Karl Griesbaum, Elizabeth, N.J., assignors to Esso Research and Engineering Company, a corporation of Delaware
No Drawing. Continuation-in-part of application Ser. No. 298,440, July 29, 1963. This application Dec. 11, 1967, Ser. No. 689,255
Int. Cl. B01j 1/10; C07c 149/08, 149/36
U.S. Cl. 204—162                    17 Claims

ABSTRACT OF THE DISCLOSURE 1,2-disubstituted ethylene compounds of predominantly cis- form are secured with a process involving the free radical addition of thiols to a mono-substituted acetylenic compound. The stereochemical course of the addition reaction depends upon the molar ratios of the reactants present in the reaction zone. A minimum of 10 moles of acetylenic reactant per mole of thiol reactant is required in order to secure a product containing at least about 80 mole percent of the cis-monoadduct. The cis-monoadducts exhibit pesticidal activity.

CROSS-REFERENCE TO RELATED APPLICATION

This application is a continuation-in-part of Ser. No. 298,440, filed July 29, 1963.

BACKGROUND OF THE INVENTION

Field of the invention

This invention relates to a novel free radical addition reaction and the products obtainable therefrom. More particularly, the invention relates to a stereoselective free radical addition reaction of thiols with acetylenic compounds to yield products composed predominantly of cis-monoadducts. The cis-monoadducts exhibit excellent activity as pesticides, particularly fungicides and nematocides.

Description of the prior art

Free radical addition of thiols to mono-substituted acetylenes is known in the art and is expected to occur in an anti-Markownikoff manner to yield a 1,2-disubstituted ethylene product composed of cis- and/or trans-isomers. However, little is known about the stereochemistry of such radical additions. A 1935 literature article (J. Am. Chem. Soc., 57, 1316) discloses the addition of 4-toluenethiol to phenylacetylene in the absence of a catalyst to yield a reaction product containing equal quantities of cis- and trans-1-p-tolylmercapto-2-phenylethene. This reaction was repeated 25 years later (J. Am. Chem. Soc., 83, 4636 (1961)), in the presence of a peroxide catalyst and was found to take place by the following chain mechanism:

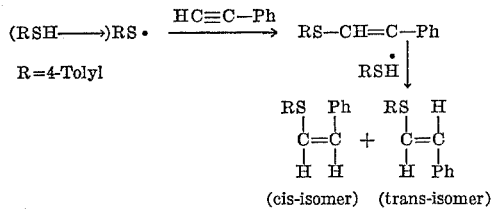

R=4-Tolyl (cis-isomer) (trans-isomer)

In addition to the above-cited articles, it has been pointed out in Acetylenic Compounds in Organic Synthesis, Academic Press, 1955, that the free radical addition of thiols, especially thiolacetic acid, to triple bonds does not appear to be stereospecific as both geometrical isomers of the product have been isolated in several cases.

SUMMARY OF THE INVENTION

It has now been discovered that the overall stereochemical course of the thiol-mono-substituted acetylenic compound addition reaction depends on the relative ratios of the reactants. Thus, for example, reaction of a 20-fold molar excess of phenylacetylene with benzenethiol yielded a product mixture containing 95 mole percent of the corresponding cis-monoadduct, while a 20-fold excess of the thiol yielded a product mixture containing only 16 mole percent of the cis-adduct with the remainder being trans-adduct. While not wishing to be bound by any particular theory, it is believed that the excess of the thiol reactant functions to accelerate the isomerization of the cis-monoadduct originally formed in the reaction thereby yielding substantial quantities of the trans-monoadduct, while an excess of the acetylenic reactant serves to depress such isomerization.

Therefore, according to the present invention, for a selective synthesis of a 1,2-disubstituted ethylene product composed predominantly of the cis-monoadduct, a molar excess of acetylene reactant above the thiol of at least about 2:1 is employed. In a particularly selective process wherein a product composed of at least about 80 mole percent of the cis-monoadduct is obtained, at least about 10 moles of acetylenic compound is employed in the reaction zone per mole of thiol in the case of aliphatic acetylenes, and at least about 3 moles of acetylenic compound per mole of thiol in situations where aromatic acetylenes are used.

It is another feature of this invention that the adducts formed as above described and containing 80% or more of the cis-monoadduct possess biological activity and thus may be employed as pesticides such as fungicides, nematocides, and the like, either alone or in combination with other ingredients. Compounds of this invention have been demonstrated as being active against fungi such as *Aspergillus niger*, *Penicillium expansum* and *Trichophyton interdigitale* indicating a potential use in the field of mildew proofing and as a seed protectant. In addition, control of root knot nematode on tomato has been demonstrated with other compounds of this invention.

The overall reaction contemplated by this invention may be represented by the following equation:

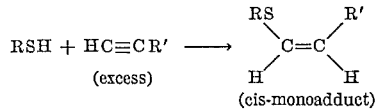

The thiol, preferably an organic mono-thiol, that is utilized as a starting material in the reaction has the general formula: RSH, wherein R is (1) A $C_1$–$C_{35}$ alkyl group, preferably a $C_1$–$C_{12}$ primary or secondary monovalent alkyl group, e.g., methyl, n-propy, sec-butyl, n-hexadecyl, octadecyl, dodecyl, etc.; (2) a $C_6$–$C_{20}$ aryl group, preferably a $C_6$–$C_{12}$ monovalent aryl group, e.g., phenyl, naphthyl, phenanthryl, etc.; (3) a $C_7$–$C_{50}$, preferably a $C_7$–$C_{18}$ alkylaryl group, e.g., monophenyl, octadecylphenyl, tolyl, etc.; (4) a $C_7$–$C_{30}$, preferably a $C_7$–$C_{18}$ arylalkyl group, e.g., benzyl, xylyl, naphthylmethyl, phenylisopropyl ,etc.; (5) a $C_1$–$C_{35}$ substituted alkyl group preferably a $C_1$–$C_{12}$ monosubstituted, monovalent alkyl group, e.g., aminoethyl, hydroxyethyl, mercaptoethyl, carboxyethyl, chlorododecyl, carboalkoxyalkyl radicals such as carboethoxymethyl, etc.; (6) a $C_6$–$C_{50}$ substituted aryl or alkylaryl group, preferably a $C_6$–$C_{18}$ monosubstituted, monovalent group, e.g., chlorophenyl, nitroethyl, aminophenyl, etc.; (7) a $C_1$–$C_{12}$ acyl group, for example acetyl, propionyl, lauroyl, benzoyl, and dialkoxy-thio-phosphoryl or dialkoxy-phosphoryl radicals having from 2 to 8 carbon atoms.

Particularly preferred thiols are those compounds wherein R is a $C_{16}$ organic radical or lower, most particularly a monovalent organic radical having 1 to 10 carbon atoms, since it is well known that the higher molecular weight reagents tend to slow down addition reactions.

The acetylenic compounds utilized as starting materials in the process have the general formula: $H-C\equiv C-R'$, wherein R' may be a (1) a $C_1$-$C_{35}$ alkyl group, preferably a $C_1$-$C_6$ monovalent alkyl group, e.g., methyl, ethyl, butyl, etc.; (2) a $C_6$-$C_{20}$ aryl group, preferably a $C_6$-$C_{10}$ monovalent aryl group, e.g., phenyl, naphthyl, phenanthryl, etc.; (3) a $C_7$-$C_{50}$, preferably a $C_7$-$C_{12}$ alkylaryl group, e.g., tolyl, mesityl, dimethylnaphthyl, nonylphenyl, butylnaphthyl, etc.; (4) a $C_1$-$C_{35}$ substituted alkyl group, preferably a $C_1$-$C_{12}$ monosubstituted, monovalent alkyl group, e.g., chloropropyl, nitroamyl, hydroxymethyl, chloromethyl, cyanopropyl, carboxymethyl, etc.; (5) a $C_6$-$C_{50}$ substituted aryl or alkylaryl group, preferably a $C_6$-$C_{18}$ monosubstituted, monovalent aryl or alkylaryl group, e.g., bromonaphthyl, nitrotolyl, chlorophenyl, chlorononylphenyl, etc.; (6) a $C_1$-$C_8$, preferably a $C_1$-$C_2$ carboxylic acid radical, e.g., carboxyl, carboxymethyl, etc.; or (7) a $C_1$-$C_{20}$, preferably a $C_1$-$C_4$ substituted carboxylic acid, e.g., carboethoxy, carbomethoxypropyl, etc.

Representative, non-limiting examples of useful acetylenic compounds include: phenylacetylene, methylacetylene, ethylacetylene, butylacetylene, benzylacetylene, tolylacetylene, chlorophenylacetylene, chloroacetylene, propargyl alcohol, propargyl chloride, propargyl methyl sulfide, propargyl thiocyanate, propiolic acid, propiolic acid methyl ester, etc.

Representative, non-limiting examples of applicable thiol reactants include: methanethiol, 1-propanethiol, 2-propanethiol, 1-dodecanethiol, benzenethiol, 2-naphthalenethiol, α-toluenethiol, nonylbenzenethiol, hydroxyethanethiol, ethyl mercaptoacetate, cyanoethanethiol, chlorobenzenethiol, chlorotoluenethiol, methylthiobenzenethiol, dichlorobenzenethiol, thiolacetic acid, thiobenzoic acid, thiobutyric acid, thiododecanoic acid, diethyl dithiophosphoric acid, and dimethyl mono thiophosphoric acid.

Although any of the above-named materials will operate in the process of this invention, it is especially preferred that R' be a monovalent organic radical having 1 to 10 carbon atoms since it is well known to those skilled in the art that the speed of addition reactions is dependent to a large extent on the molecular weight of the reactants.

The cis-isomers of 1,2-disubstituted ethylene, defined above by the formula

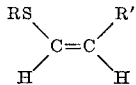

obtained by carrying out the process of this invention will have compositions dependent upon the selection of the particular acetylenic compounds and thiols used in the reaction. Typical reaction products produced by this invention are those in which R and R' are organic radicals having 1 to 10 carbon atoms, for example, cis-1-acetylmercapto-2-phenylethene and cis-1-phenylmercapto-2-phenylethene.

The ratio of reactants is a critical feature of this invention since the production of a product composed predominantly (greater than 50 mole percent) of the cis-monoadduct is dependent on the presence of at least about a 2:1 to 3:1 molar excess of the acetylenic reactant within the reaction zone. Usually, a minimum molar ratio of 10 moles of acetylenic reactant per mole of thiol reactant is required in order to obtain a product composed of at least about 80 mole percent of the cis-monoadduct when aliphatic acetylenes are used; however, as stated previously, smaller acetylene-thiol ratios can be used to obtain high cis-content products when aromatic acetylenes are used as the process reactants. Higher molar ratios of acetylenic compound to either aliphatic or aromatic thiols in the range of 10/1 to 30/1, preferably 15/1 to 30/1, are preferred, however, since their use yields a final product which contains more than 90 mole percent of the cis-monoadduct. In a preferred method of reaction even larger excesses of the acetylenic compound are maintained in the reaction zone by dropwise addition of the thiol reactant to the acetylenic compound at a rate which is about equal to the reaction rate.

The reaction can be carried out in the presence of an inert solvent. Suitable inert solvents are $C_4$ to $C_{10}$ aliphatic hydrocarbons such as pentane and heptane; aromatic hydrocarbons such as benzene; chlorinated hydrocarbons such as chlorobenzene and lower alkyl alcohols such as methanol. Preferably the reaction is conducted in the absence of a solvent.

The temperature employed in the free radical additions of this invention must be controlled within reasonable limits since higher temperatures may cause post-isomerization of the cis- isomers thereby yielding substantial quantities of the trans-isomer. Suitable temperatures for the reaction are in the range of −30 to 100° C. and preferably −10° to 50° C. The addition reaction is not critically sensitive to pressure. However, pressure within the reaction zone should be sufficient to maintain the major portion of the reactants in the liquid state at the temperature employed for the reaction. In general, pressures varying from 1 to 10 atmospheres, preferably atmospheric pressure, can be used. The length of the reaction period is not critical and may vary within wide limits depending upon the choice of process reactants. Optimum reaction time may be in the range of from 5 to 10 minutes to three or more days.

While the instant addition reaction will proceed merely upon heating the reagents, it is desirable to employ a free radical initiator to promote the formation of the desired product. Irradiation such as ultraviolet light or gamma-radiation alone or in conjunction with the application of heat may be used to promote the addition reaction. Additionally, chemical free radical initiators such as organic peroxides, preferably alkyl peroxides; azo compounds; etc. may be used instead of radiation or in combination with it. Representative examples of useful chemical initiators include: p-butyl hydroperoxide, cumene hydroperoxide, bis-t-butyl peroxide, benzoyl peroxide, azo-bis-isobutyronitrile, etc. Generally, only minor quantities of the chemical initiators are necessary to promote the addition reaction. Normally, between 0.05 to 10 mole percent, preferably about 0.2 to 5.0 mole percent, of the chemical initiator is used, based upon the number of moles of reactants present within the reaction zone.

As noted earlier, the cis-monoadduct products formed with the process of this invention are useful as pesticides, particularly as fungicides and nematocides. In use, these compounds may be reduced to an impalpable powder and applied as an undiluted dust or mixed with a carrier. Useful solid carriers include clay, talc and bentonite. The compounds may also be applied as a spray in a liquid carrier either as a solution in a solvent or as a suspension in a non-solvent, such as water. When applied as a water spray, it may be desirable to incorporate wetting agents into the water spray.

The compounds of this invention are generally soluble in organic solvents such as acetone, ethanol, benzene, naphtha, etc., although it should be recognized that different compounds exhibit varying solubilities. Typical water-soluble wetting agents that may be incorporated into water spray insecticide systems include the sulfates of long chain alcohols such as dodecanol octadecanol; sulfonated amide and ester derivatives of the long chain alcohols; sulfonated aromatic and mixed alkylaryl derivatives of the long chain alcohols; esters of fatty acids such as the ricinoleic ester of sorbitol; as well as petroleum sulfonates of $C_{10}$ to $C_{20}$ length. Nonionic emulsifying agents such as the ethylene oxide condensation products of alkylated phenols may also be used.

The compounds of the invention may also be admixed with carriers that are themselves active such as other fungicides, nematocides, herbicides, fertilizers and wetting agents.

DESCRIPTION OF THE PREFERRED EMBODIMENTS

The invention will be further understood by reference to the following examples.

Example 1

The stereoselective nature of the addition reaction was demonstrated by carrying out a series of reactions using phenyl acetylene and a variety of thiols. In each instance, 0.01 mole of the thiol was added dropwise to a flask containing 0.1 mole of phenyl acetylene. The reaction mixture was maintained at 0° C. and irradiated with ultraviolet light for the time indicated. Analysis of the final product was by gas chromatography (G.C.) or nuclear magnetic resonance (N.M.R.) spectroscopy. The results are given in Table I below:

TABLE I.—STEREOSELECTIVE ADDITION OF THIOL (0.01 MOLE) TO AN EXCESS OF PHENYLACETYLENE (0.1 MOLE)

| Added thiol | After U.V. irradiation at 0°, cis-adduct, mole percent of total product | | | |
|---|---|---|---|---|
| | By GC | | | By NMR |
| | 1 hr. | 3 hrs. | 5 hrs. | 5 hrs. |
| Methanethiol | 87 | | | 84 |
| Ethanethiol | 88 | 85 | 85 | |
| n-Butanethiol | 90 | 87 | 88 | |
| Thiolacetic acid | | | | 80 |
| Benzenethiol | | | | 90 |
| Toluenethiol | | | | 90 |

The results show that the high, i.e. ten fold, excess of the acetylene compound resulted in a high selectivity to the cis-adducts.

Example 2

The effect of variations in the molar ratio of reactants on the stereoselectivity of the reaction was demonstrated by carrying out addition reactions with benzenethiol and phenylacetylene. Each reaction was carried out by mixing the stated ratio of reactants in a heptane solvent at 0° C. with ultraviolet irradiation for 2 hours. The results are summarized in Table II below.

TABLE II.—STEREOSELECTIVE ADDITION OF BENZENE-THIOL TO AN EXCESS OF PHENYLACETYLENE AT 0°C. WITH U.V. IRRADIATION FOR 2 HRS.

| Heptane solution of reactants, mole/liter | | Cis-adduct, mole percent of total product (1-phenylmercapto-2-phenyl-ethylene) by N.M.R. |
|---|---|---|
| Benzenethiol | Phenylacetylene | |
| 0.05 | 1.1 | 95 |
| 1.0 | 1.1 | 56 |
| 1.0 | 0.05 | 16 |

The results show a decreasing amount of cis-adduct formed with the increasing concentration of the thiol reactant.

Example 3

The effect of an excess of thiol reactant on the post-isomerization of the cis-adduct derived from an addition reaction between a thiol and an acetylenic compound was demonstrated. Ethanethiol (0.2 mole) was added to a heptane solution containing 78 mole percent of the cis-adduct of 1-ethylmercapto-2-phenylethene. The mixture was maintained for 5 hours at 0° C. and was irradiated with ultraviolet light. Analysis of the final mixture by N.M.R. indicated that 70 mole percent of the cis-adduct had been isomerized to the trans-adduct.

Example 4

A sample of cis-1-acetylmercapto-2-phenylethene was tested for antifungal activity at levels of 1 and 0.1 weight per volume percent against each of five representative fungi. Aliquots of the samples were dissolved in minimal quantities of acetone and made to 1 weight per volume percent concentration with distilled water. Further 1:10 dilutions were made with distilled water to provide 0.1 weight per volume percent concentrations. The antifungal test employed was the agar plate test as described in U.S.D.A. Circular No. 198, (1931). All tests were performed upon Difco Sabouraud Dextrose Agar. The results are summarized in Table III below.

TABLE III

| Concentration (wt. per vol. percent) | Width of zone of inhibition (mm.) | | |
|---|---|---|---|
| | Aspergillus Niger | Penicillium Expansum | Trichophyton Interdigitale |
| 1.0 | 25 | 30 | 3 |
| 0.1 | 9 | 20 | 0 |

The high level of effectiveness of the compound against these fungi indicates potential use as a grain and seed protectant and in the field of mildew-proofing.

Example 5

Cis-1-phenylmercapto-2-phenylethene, the reaction product of benzene thiol and phenylacetylene was tested against root knot nematode on tomato. The nematocide screening test used 0.41 gram sample per gallon of soil which is equivalent to 100 pounds per four inch acre. In this test, tomato plants were reared in the soil infected with Meloidogyne species. After four weeks, the number of root knots on the treated and untreated plants was compared. This comparison indicated that cis-1-phenylmercapto-2-phenylethene controlled the nematodes to an extent of 95%.

Having thus described the general nature and specific embodiments of the present invention, the true scope is now pointed out by the appended claims.

What is claimed is:

1. A stereoselective free radical process which comprises contacting in a reaction zone an organic thiol compound with a monosubstituted acetylenic compound, at least about two moles of acetylenic compound being employed in said reaction per mole of thiol compound, said reaction being conducted at a temperature ranging from −30 to 100° C. for a time sufficient to recover a product composed predominantly of a cis-1,2-disubstituted ethylene compound.

2. The process of claim 1 wherein an aliphatic monosubstituted acetylenic compound is reacted with said thiol compound, at least about 10 moles of said acetylenic compound is employed in said reaction per mole of thiol, and the reaction product recovered is composed of at least about 80 mole percent of said cis-1,2-disubstituted ethylene compound.

3. The process of claim 2 wherein the thiol compound has the general formula RSH and the acetylenic compound has the general formula H—C≡C—R, wherein R and R' are monovalent organic radicals having from 1–10 carbon atoms.

4. The process of claim 3 wherein said process is conducted in the presence of a free radical initiator.

5. The process of claim 1 wherein an aromatic monosubstituted acetylenic compound is reacted with said thiol compound, at least about 3 moles of said acetylenic compound is employed in said reaction per mole of thiol, and the reaction product recovered is composed of at least about 80 mole percent of said cis-1,2-disubstituted ethylene compound.

6. The process of claim 1 wherein the thiol compound has the general formula RSH and the acetylenic compound has the general formula H—C≡C—R' wherein R and R' are monovalent organic radicals having 1 to 10 carbon atoms.

7. The process of claim 6 wherein R is selected from the group consisting of dialkoxy-thiophosphoryl and dialkoxyphosphoryl radicals having from 2 to 8 carbon atoms.

8. The process of claim 1 wherein the thiol compound has the general formula RSH and the acetylenic compound has the general formula H—C≡C—R' wherein R is a $C_1$ to $C_{12}$ alkyl group, a $C_6$ to $C_{12}$ monovalent aryl group, a $C_7$ to $C_{18}$ alkylaryl group or a $C_1$ to $C_{12}$ acyl group and R' is a $C_1$ to $C_6$ alkyl group or a $C_6$ to $C_{10}$ aryl group.

9. The process of claim 8 wherein said reaction is initiated with irradiation.

10. The process of claim 8 wherein R is a primary or secondary monovalent alkyl group having from 1 to 12 carbon atoms.

11. The process of claim 8 wherein R' is an aryl group having from 6 to 10 carbon atoms.

12. The process of claim 8 wherein said process is conducted in the presence of a chemical free radical initiator.

13. The process of claim 8 wherein said process is conducted in the presence of a free radical initiator.

14. The process of claim 1 wherein said thiol is added to said acetylenic compound at a rate about equal to the reaction rate.

15. The process of claim 1 wherein said thiol is thiolacetic acid, said acetylenic compound is phenylacetylene, and said cis-monoadduct is cis-1-acetylmercapto-2-phenylethene.

16. The process of claim 1 wherein said thiol is benzene-thiol, said acetylenic compound is phenylacetylene and said cis-monoadduct is cis-1-phenylmercapto-2-phenylethene.

17. The process of claim 1 wherein said process is conducted in the presence of a free radical initiator.

References Cited

UNITED STATES PATENTS 2,352,435  6/1944  Hoeffelman et al. __ 204—162 X

HOWARD S. WILLIAMS, Primary Examiner

U.S. Cl. X.R.

204—158; 260—609